United States Patent
Rosingana et al.

(10) Patent No.: US 11,543,248 B2
(45) Date of Patent: Jan. 3, 2023

(54) INERTIAL MEASUREMENT SYSTEM WITH SMART POWER MODE MANAGEMENT AND CORRESPONDING SMART POWER MODE MANAGEMENT METHOD

(71) Applicant: STMicroelectronics S.r.l., Agrate Brianza (IT)

(72) Inventors: Paolo Rosingana, Savigliano (IT); Alessandra Maria Rizzo Piazza Roncoroni, Abbiategrasso (IT); Federico Rizzardini, Settimo Milanese (IT); Lorenzo Bracco, Chivasso (IT); Stefano Paolo Rivolta, Desio (IT); Marco Bianco, Cesano Boscone (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 265 days.

(21) Appl. No.: 16/932,526

(22) Filed: Jul. 17, 2020

(65) Prior Publication Data

US 2021/0033402 A1 Feb. 4, 2021

(30) Foreign Application Priority Data

Jul. 31, 2019 (IT) .................... 102019000013434

(51) Int. Cl.
| | |
|---|---|
| *G06F 3/038* | (2013.01) |
| *G01C 21/18* | (2006.01) |
| *G06F 1/3206* | (2019.01) |
| *G06F 3/0346* | (2013.01) |

(52) U.S. Cl.
CPC ........... *G01C 21/18* (2013.01); *G06F 1/3206* (2013.01); *G06F 3/0346* (2013.01)

(58) Field of Classification Search
CPC ..... G01C 21/18; G06F 1/3206; G06F 3/0346; G06F 3/038; G06F 3/02; G09G 5/00
See application file for complete search history.

(56) References Cited

U.S. PATENT DOCUMENTS

| | | | |
|---|---|---|---|
| 9,483,129 B1* | 11/2016 | Holsen | G06F 3/0441 |
| 2014/0347274 A1* | 11/2014 | Koh | G06F 15/80 |
| | | | 345/158 |
| 2015/0054776 A1* | 2/2015 | Reitan | G06F 3/0441 |
| | | | 345/174 |

(Continued)

OTHER PUBLICATIONS

Derungs, A., et al., "Motion-adaptive duty-cycling to estimate orientation using inertial sensors," The First Symposium on Activity and Context Modeling and Recognition, 2014, 9 pages.

*Primary Examiner* — Pegeman Karimi
(74) *Attorney, Agent, or Firm* — Slater Matsil, LLP

(57) ABSTRACT

An embodiment inertial measurement system includes: at least one motion sensor to output motion data with an output data rate (ODR) period; and a control unit coupled to the motion sensor to control operation thereof based on a power mode switching, according to which each ODR period includes: a first phase, in which the motion sensor is controlled in a condition of low power consumption; and a subsequent measurement phase, in which the motion sensor is controlled to perform measurements for generation of measurement data. The control unit adaptively adjusts the duration of the ODR period based on at least one check related to the measurement data generated during the measurement phase.

20 Claims, 4 Drawing Sheets

(56) References Cited

U.S. PATENT DOCUMENTS

2015/0324029 A1\* 11/2015 Bakken ............... G06F 3/03545
                                                              345/174
2017/0003767 A1\* 1/2017 Holsen .................. G06F 3/0443

\* cited by examiner

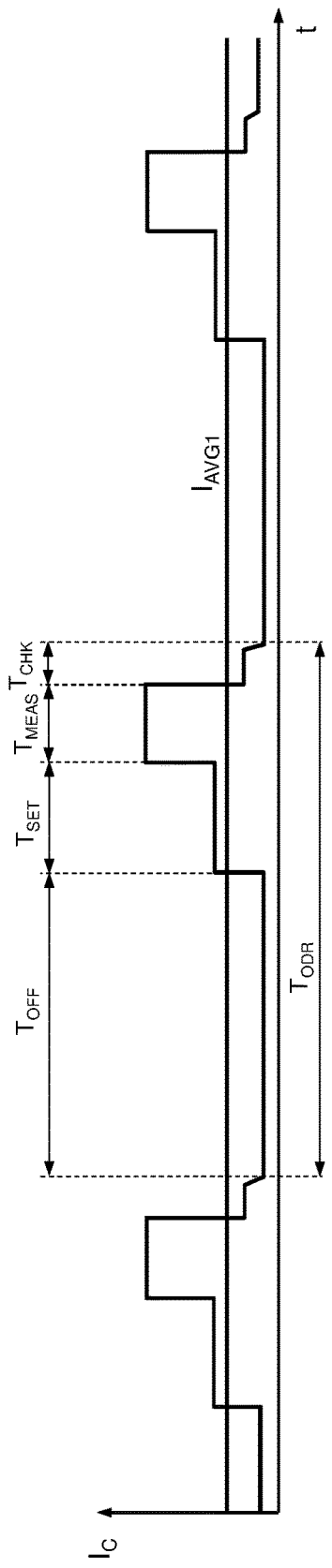
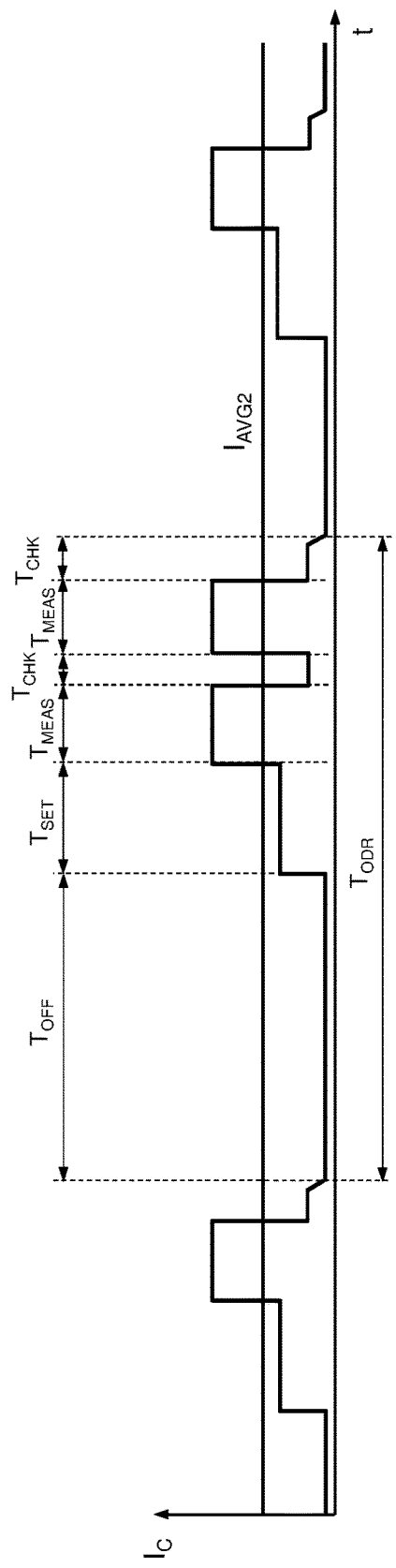

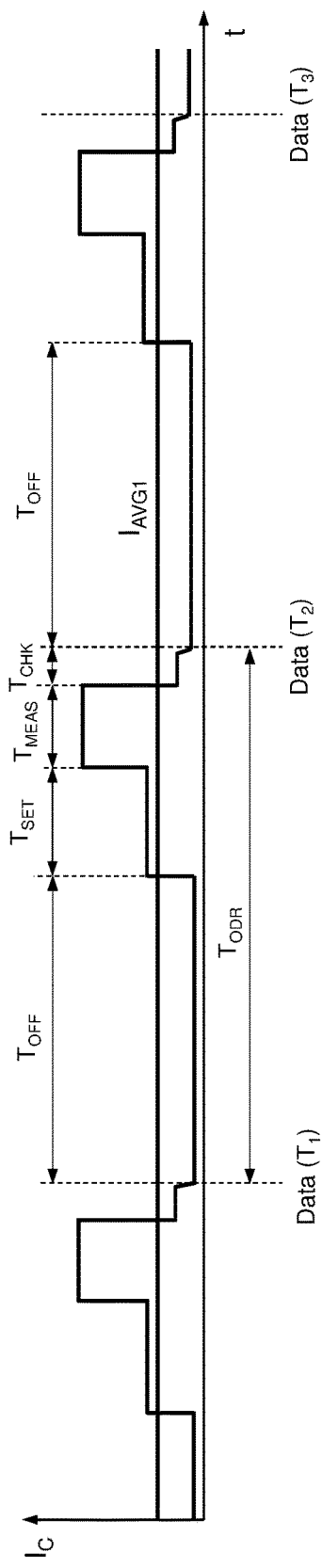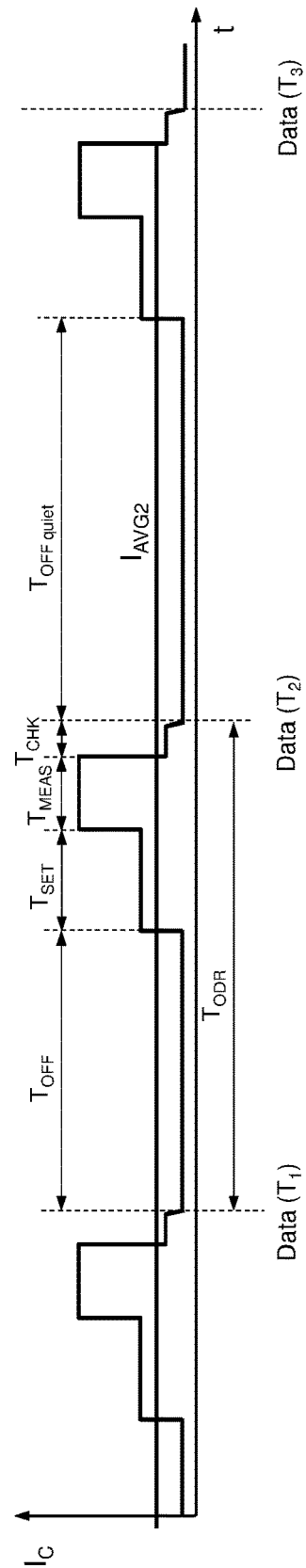

INERTIAL MEASUREMENT SYSTEM WITH SMART POWER MODE MANAGEMENT AND CORRESPONDING SMART POWER MODE MANAGEMENT METHOD

CROSS-REFERENCE TO RELATED APPLICATIONS

This application claims the benefit of Italian Application No. 102019000013434, filed on Jul. 31, 2019, which application is hereby incorporated herein by reference.

TECHNICAL FIELD

The present solution relates to an inertial measurement system with smart power mode management and to a corresponding smart power mode management method.

BACKGROUND

Inertial measurement systems are known, including one or more inertial, or motion, sensors (for example a tri-axial accelerometer and a tri-axial gyroscope, in the case of so-called 6x, or 6 degrees of freedom (dof), inertial measurement systems) and an associated control unit, controlling operation of the inertial sensors and interfacing with an associated external electronic device (for example a portable or wearable electronic device).

In particular, inertial measurement systems are known where the inertial sensors are made with MEMS (Micro Electro Mechanical System) technology, comprising: a micromechanical structure including at least one inertial mass, a detection arrangement, e.g., formed by detection electrodes, coupled to the inertial mass to generate at least one motion quantity in response to movements of the inertial mass, e.g., along three axes of an associated reference system (in the case of tri-axial sensors), and possibly an actuation arrangement (in case of active micromechanical structures, like in gyroscope sensors), e.g., including actuation electrodes; and an associated electronic circuitry (e.g., ASIC—Application Specific Integrated Circuit), coupled to the micromechanical structure and including a reading or processing part configured to process the motion quantity generated by the same micromechanical structure and generate at the output a detection signal indicative of the detected motion (e.g., an acceleration signal in the case of an accelerometer sensor, or an angular-rate signal in the case of a gyroscope sensor), and possibly (in case of active micromechanical structures) an actuation or driving part to provide suitable actuation signals to the actuation arrangement.

The micromechanical structure may be made in a first die of semiconductor material, and the associated electronic processing circuit may be made in a second die of semiconductor material, and both the first and second dies may be housed in a same package of the inertial sensor.

Inertial measurement systems are frequently used in electronic devices, for example of the portable (or hand-held) or wearable type, due to their reduced size occupation and power consumption.

For example, digital (or smart) pen (or pencil or stylus) are portable digital-pen-like devices that are designed to be coupled to an electronic apparatus acting as a host apparatus (e.g., a tablet, a phablet, a smartphone, a laptop, a smart TV, a monitor, or the like) and may have several functions in addition to that of taking notes and making drawings.

Those additional functions may include a pointing function, the digital-pen-like device in this case acting as an "air pointer," designed to implement a HID (Human Interface Device) pointer (or mouse) interface, or protocol, in order to generate displacement data (in particular, information associated with a displacements between a current and a previous position of the same digital-pen-like device) and send the displacement data to the host apparatus, to be translated in terms of screen-frame coordinates in a display of the same host apparatus. The host apparatus is thus able to move a displayed object (e.g., a cursor or similar element) on the screen-frame of the corresponding display based on the received displacement data.

Digital-pen-like devices may therefore include an inertial measurement system, e.g., comprising an accelerometer and a gyroscope sensors, to monitor the movements of the same devices and allow implementation of the above defined "air-pointer" function and possibly of additional functions (such as gesture-recognition functions).

As it is known, new generation hand-held devices, such as the above-discussed digital-pen-like devices, are required to have very small dimensions (with an, e.g., ultra-slim design) with very stringent size constraints, and consequently have limited capabilities in terms of battery (a very low-power consumption is therefore required). Moreover, these devices have to meet desired requirements in terms of the user experience, including high accuracy and precision, reduced latency, smoothness, etc., in particular in case of implementation of the above discussed air-pointer function or of further advanced functions.

In order to reduce power consumption, inertial measurement systems are known to implement a low power operating mode for the corresponding inertial sensors, with so-called power mode switching.

In particular, each output-data-rate (ODR) period (i.e., the time interval between two consecutive outputs of inertial data from the inertial measurement system) is divided according to a time frame division approach in consecutive operating intervals or phases: a first time interval, during which the inertial sensor is operated with a reduced power consumption; a second time interval, e.g., a "settling interval"; and a third time interval, e.g., a "measuring interval," during which (after the system has suitably settled) measurement of the quantities to be detected is performed in order to generate the inertial data to be provided at the output (in a known manner, measurement may imply averaging a certain number of measures or samples to generate the measured data).

In detail, in known solutions, the first time interval may correspond to an 'OFF' interval, where the inertial sensor is not powered (i.e., both the micromechanical structure and at least part of the associated electronic circuitry are not supplied) with near-zero current consumption (i.e., power consumption being limited only to leakage currents), such as in accelerometer sensors (or other sensors with passive micromechanical structures); or may correspond to a 'SLEEP' interval, with reduced power consumption (at least part of the micromechanical structure being biased in order to maintain its movement, while in the electronic circuitry the reading part being not supplied and the driving part being, at least partially, supplied), such as in gyroscope sensors (or other sensors where the micromechanical structure includes active parts, which are biased to perform an actuation movement, e.g., a resonant oscillating movement required for angular-rate detection in the case of gyroscope sensors).

It is noted that the above-discussed sleep interval is required in order to reduce the power consumption and at the same time have a fast turn-on and settling time (due to the fact that both the driving part of the electronic circuitry and the active part of the micromechanical structure (e.g., an oscillating mass) are kept on, while the reading part of the same electronic circuitry is turned off.

Moreover, the settling interval requires a power consumption that is higher than the OFF or SLEEP intervals, due to the fact that at least part of the micromechanical structure and/or the electronic circuitry is turned-on, in order to allow settling towards a regime condition.

The measurement interval is performed with all the micromechanical structure and the electronic circuitry turned-on; this could require, in turn, a higher consumption than the settling interval.

In this regard, FIG. 1A shows the plot of the current consumption $I_c$ in an inertial system due to an accelerometer sensor, where, during each ODR period (denoted with $T_{ODR}$), the following consecutive intervals are present: a first 'OFF' interval (denoted with $T_{OFF}$), a subsequent settling interval (denoted with $T_{SET}$) and a final measurement interval (denoted with $T_{MEAS}$), after which motion data are ready at the output (as denoted by the corresponding data ready interrupt signal DRDY).

In a corresponding manner, FIG. 1B shows the plot of the current consumption in the inertial system due to a gyroscope sensor, where, during each ODR period $T_{ODR}$, the following consecutive intervals are present: a first 'SLEEP' interval (denoted with $T_{SLEEP}$), the subsequent settling interval (denoted again with $T_{SET}$) and the final measurement interval (denoted again with $T_{MEAS}$).

In the known inertial measurement systems, the duration of the above discussed time intervals is set by design, according to the characteristics of the sensors and the application, so that also the output data rate interval ($T_{ODR}$) is fixed and set by design.

SUMMARY

The present Applicant has realized that these known solutions may not be sufficient to guarantee the desired power consumption and user experience requirements of inertial measurement systems for next-generation portable or wearable devices, such as the above-discussed digital-pen-like devices.

The need is therefore felt for an improved inertial measurement system, allowing to generate inertial data (e.g., for implementing a pointer function in a digital-pen-like device) minimizing current consumption preserving data accuracy and reliability and thus the user experience.

The aim of the present solution is to satisfy, at least in part, the above need.

According to the present solution, an inertial measurement system and a corresponding method are consequently provided, as defined in the appended claims.

BRIEF DESCRIPTION OF THE DRAWINGS

For a better understanding of the present invention, preferred embodiments thereof are now described, purely by way of non-limiting examples and with reference to the attached drawings, wherein:

FIGS. 3A-3B show plots of quantities related to the current consumption of the inertial measurement system of FIG. 2;

FIGS. 5A-5B show further plots of quantities related to the current consumption of the inertial measurement system of FIG. 2, according to a further embodiment thereof.

DETAILED DESCRIPTION OF ILLUSTRATIVE EMBODIMENTS

Figure 1A:
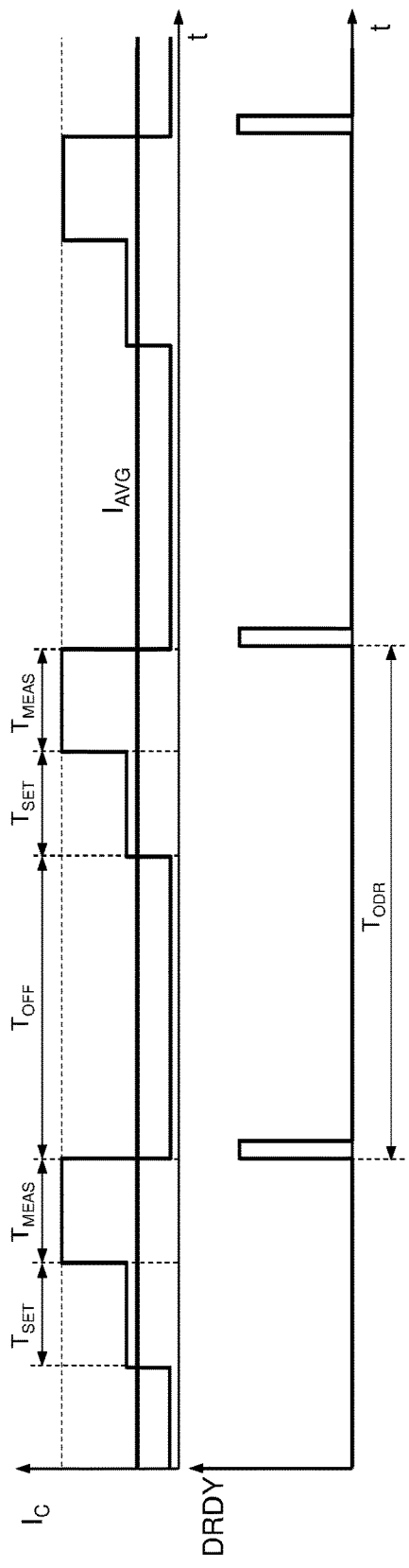
FIGS. 1A-1B show plots of quantities related to a known inertial measurement system.
Figure 1B:
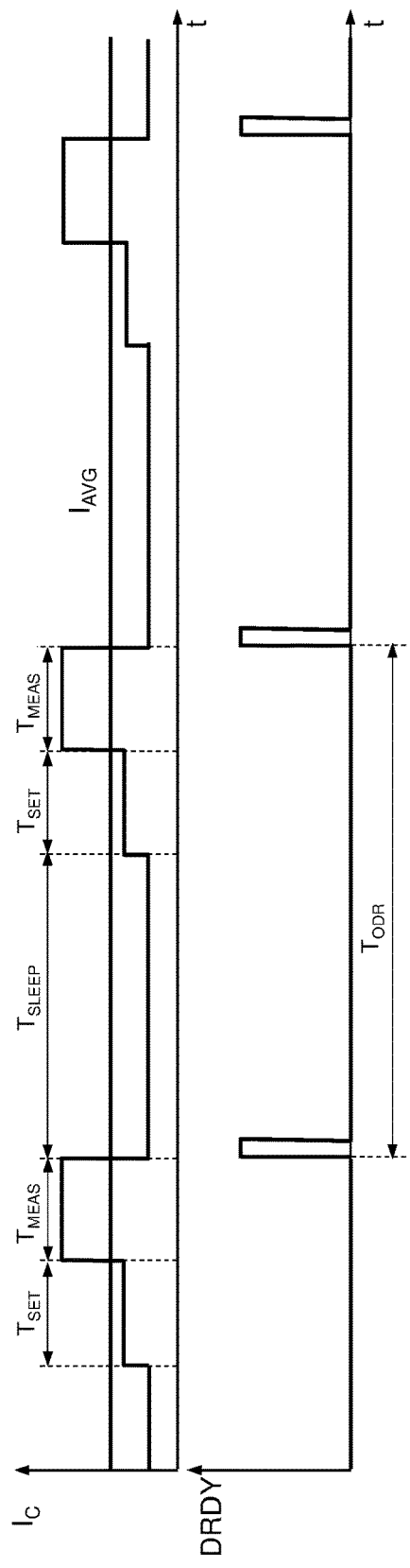
Figure 2:
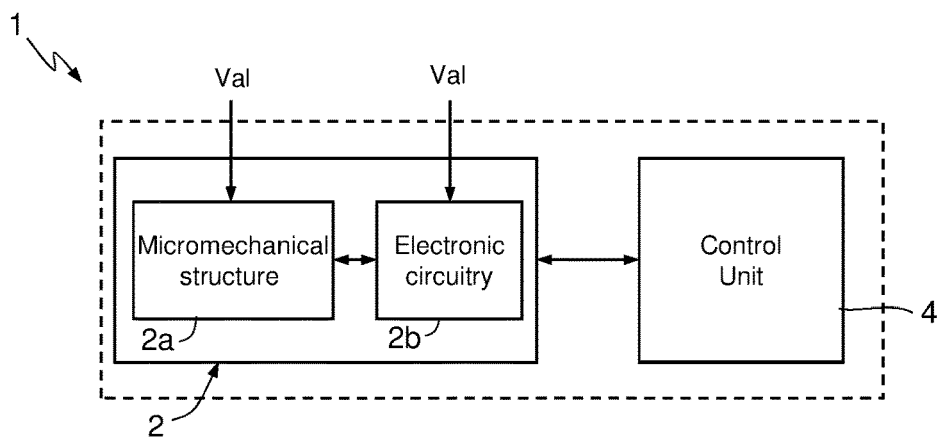
FIG. 2 is a schematic block diagram of an inertial measurement system, according to an embodiment of the present solution.

FIG. 2 shows an inertial measurement system 1, comprising at least one inertial sensor 2, e.g., a MEMS accelerometer or a gyroscope tri-axial sensor (or both accelerometer and gyroscope sensors, in case of a 6× inertial measurement system) and an associated control unit 4, e.g., a microcontroller unit (or a microprocessor unit or any other suitable computing or processing unit).

In particular, and as previously discussed, the inertial sensor 2 comprises:

a micromechanical structure 2a including, in case of "passive" structures, at least one inertial mass and an associated detection arrangement coupled to the inertial mass to generate at least one motion quantity in response to movements of the inertial mass; and, moreover, in case of "active" structures, an actuation arrangement coupled to the same inertial mass (or to a further mass or element) to cause its movement according to the received driving signals; and an associated electronic circuitry 2b (ASIC), coupled to the micromechanical structure 2a and including a reading part configured to process the motion quantity generated by the micromechanical structure 2a and generate at the output at least one detection signal $S_{det}$ indicative of the detected motion, and moreover, in case of active structures, a driving part to provide suitable driving signals $S_{dr}$ to the actuation arrangement of the same micromechanical structure 2a.

As shown schematically, the micromechanical structure 2a and the associated electronic circuitry 2b receive a biasing signal Val, e.g., from a power supply source, e.g., a battery (here not shown); in particular, the biasing signal is provided to the detection and actuation arrangements of the micromechanical structure 2a and to the reading and driving parts of the electronic circuit 2b.

The control unit 4 is configured to activate a power-down mode, with reduced power consumption, wherein biasing of the micromechanical structure 2a and of at least part of the associated electronic circuitry 2b is turned off.

As will be discussed in detail in the following, according to an aspect of the present solution, the control unit 4 is configured to implement an automatic power mode switching of the inertial sensor 2 of the same inertial measurement system 1. In other words, a time frame division of each output-data-rate (ODR) period is not fixed by design, as in known solutions, but is instead determined by the control unit 4 during operation of the inertial measurement system 1, dynamically and adaptively based on checks performed related to the measured motion data.

In particular, the ODR period is again divided in distinct phases or time intervals, namely: a first phase, during which the inertial sensor 2 is operated with a reduced power consumption (as will be discussed hereinafter, however, in this case, this first phase is always an 'OFF' phase, for any kind of inertial sensor 2, i.e., both for passive and for active sensors); a second phase, the "settling" phase; and a third phase, the "measuring" phase, during which measurement of the quantities to be detected is performed in order to generate motion data to be provided at the output.

According to an aspect of the present solution, a fourth phase is introduced after the "measurement" phase, a so-called "check" phase, during which the control unit 4 performs one or more checks related to the quality and reliability of the measured data (these checks are denoted, in general, as a "sanity check" in the following).

Based on the sanity check, the control unit 4 dynamically and adaptively adjusts the output data rate of the inertial measurement system 1. In particular, in case the sanity check is not passed (or is not satisfactory), a further measurement phase is performed, followed by a further "check" phase, where the sanity check related to the further measured data is performed. This process is iteratively repeated, until the sanity check is passed (i.e., is determined to be satisfactory), so that the measurement data are provided at the output.

FIG. 3A shows a time frame division of the ODR period of an inertial sensor 2 (e.g., an accelerometer or a gyroscope sensor) of the inertial measurement system 1, in the case in which the sanity check performed by the control unit 4 is successful, and particularly the corresponding current consumption $I_c$ for the inertial measurement system 1.

In detail, the ODR period is in this case divided in the following consecutive intervals: a first 'OFF' interval (denoted again with $T_{OFF}$); a subsequent settling interval (denoted again with $T_{SET}$); a measurement interval (denoted again with $T_{MEAS}$); and a subsequent check interval (denoted with $T_{CHECK}$), during which the sanity of the measured data is checked.

In this example, the sanity check is successful, so that motion data are provided at the output of the inertial measurement system 1 (e.g., a "data-ready" interrupt signal is generated); the 'check' interval is therefore immediately followed by a subsequent 'OFF' interval of a next ODR period.

In this case, the current consumption during the 'OFF' interval is nearly zero, being due substantially to leakage effects.

FIG. 3B shows a time frame division of the ODR period (and the corresponding current consumption $I_c$ for the inertial measurement system 1), in the case in which a first sanity check performed by the control unit 4 is not successful.

In this case, after the first 'check' interval, the following further phases are implemented: a further 'measurement' phase; and a subsequent further 'check' phase, during which the sanity of the new measured data is checked.

In this case, the second sanity check is successful, so that the measured motion data are provided at the output of the inertial measurement system 1; the second 'check' interval is therefore immediately followed by a subsequent 'OFF' interval of the next ODR period.

The control unit 4 has therefore adaptively adjusted the output data rate period ($T_{ODR}$) based on the measured data, in particular increasing the duration of the same output data rate period $T_{ODR}$ to account for the further measurement and check intervals.

The discussed adaptive ODR period approach merges the need to reduce device current consumption with the capability to maximize quality of the user experience (e.g., in terms of the accuracy and reliability of the measured data).

According to an aspect of the present solution, the first phase of the ODR period corresponds to an 'OFF' phase (with minimum power consumption, due substantially only to leakage effects) independently of the type of inertial sensor 2, i.e., both in the case of inertial sensors 2 having a passive micromechanical structure 2a (e.g., accelerometer sensors) and in the case of inertial sensors 2 having an active micromechanical structure 2a (e.g., gyroscope sensors). In particular, during the 'OFF' phase, the micromechanical structure 2a (e.g., the oscillating resonant mass of a gyroscope sensor) and the associated electronic circuitry 2b of the inertial sensor 2 are turned off.

The above feature is possible due to the presence of the discussed sanity check, that allows discarding measurements in case the settling phase is not sufficient for the micromechanical structure 2a and electronic circuitry 2b to settle to a regime condition, after turn-off.

The present Applicant has realized, with tests and simulations, that, on average, two, at most three, consecutive measurement and check phases are required to pass the sanity check and provide reliable data at the output of the inertial measurement system 1.

Indeed, this is due to the fact that the ODR period is in any case generally much lower than the time interval required for the active parts of the micromechanical structure 2a (e.g., the resonant oscillating mass of a gyroscope sensor) to completely stop the corresponding movements after turn off. In other words, the time required to the micromechanical structure 2a to return to the desired motion state is generally small, thanks to the residual movement in any case present at the end of the 'OFF' phase.

In more details, the above discussed sanity check is a control procedure implemented by the control unit 4 able to guarantee that motion data are generated when the following conditions are satisfied:

the micromechanical structure 2a of the inertial sensor 2 is correctly operating, at a regime condition (for example, the resonant oscillating movement of the gyroscope mass has the expected properties); and the electronic circuitry 2b and the related signal processing and driving chains are settled to the desired operating conditions.

Passing of the sanity check, which directly controls the adaptive adjustment of the ODR period (as previously discussed), thus allows to guarantee that the motion data (e.g., to be used for pointer calculations) are generated with minimum current consumption but also with the correct and desired integrity level.

According to a further aspect of the present solution, the control unit 4 is further configured to evaluate a quantity of motion detected by the inertial sensor(s) 2 of the inertial measurement system 1 and, based on the evaluated quantity of motion, to adaptively and dynamically adjust the duration of the 'OFF' phase (i.e., of the first interval of the ODR period).

In particular, the control unit 4 is configured to evaluate the quantity of motion based on the motion data that have passed the above discussed sanity check (in a current and in one or more of the previous ODR periods) and to implement: a first duration of the 'OFF' phase (of a next ODR period), in case the quantity of motion is lower than a certain threshold (e.g., being indicative of a quiet condition for the inertial measurement system 1 and the associated electronic device); or a second duration, lower than the first duration, in case the quantity of motion is higher than a respective threshold (that may or may not be equal than the above certain threshold).

It is noted that it may be possible to implement more durations with respective associated thresholds, or even a continuous function providing the duration of the 'OFF' phase based on the detected quantity of motion.

Adaptive adjustment of the 'OFF' phase therefore allows in the first case to further reduce the current consumption, and in the second case to more closely follow the movements to be detected, thereby preserving the desired detection quality and user experience.

Figure 4:
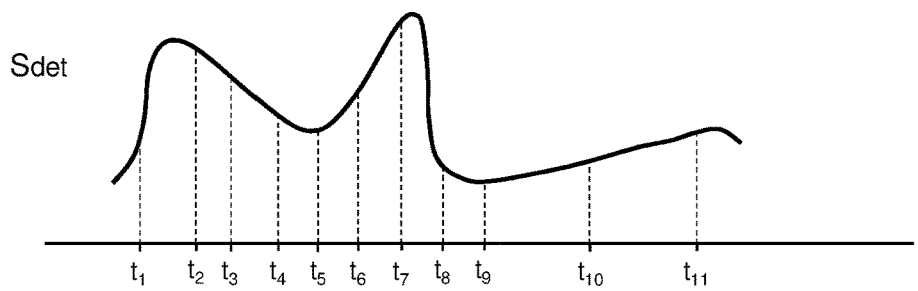
FIG. 4 shows a plot indicative of a detected quantity of motion in the inertial measurement system of FIG. 2 and of a corresponding data generation interval.

In this regard, FIG. 4 shows a plot indicative of the detected quantity of motion (i.e., of the variation of the detected motion data over time or, in other words, of the detection signal $S_{det}$), where $t_i$ denotes the times at which motion data that have passed the sanity check are provided at the output, at the end of respective ODR periods.

In the interval from t1 to t9, a first duration of the 'OFF' phase is applied, since the quantity of motion is determined to be higher than the threshold; instead, in the interval from t9 to t11, the duration of the 'OFF' phase is adaptively increased by the control unit 4, due to the fact that the quantity of motion is determined to be lower than the threshold, thus determining a corresponding increase of the ODR period.

It is also noted in the same plot that the ODR period is adaptively adjusted by the control unit 4 in the intervals from t1 to t2 and from t3 to t4 (i.e., for motion data generated at times t2 and t4), in this case due to the above discussed sanity check determining one further measurement phase to output the motion data.

In a possible embodiment, the control unit 4 is configured to compare the motion data (that have passed the sanity check) at each time t(i) with the motion data outputted at the previous time t(i-1), in order to evaluate the quantity of motion, e.g., according to the following expression:

$$|Data(t(i))-Data(t(i-1))|>Th$$

where Th is a desired motion threshold.

If the above expression is verified, the first duration of the 'OFF' phase is applied; instead, if the above expression is not verified, the duration of the 'OFF' phase is suitably increased.

Other possible solutions, however, may be implemented by the control unit 4 to determine the quantity of motion, e.g., including evaluation of the variance of the detected motion data, the average, the maximum or minimum of the same motion data in a given time interval and so on.

FIG. 5A shows a time frame division of the ODR period, in the case in which the control unit 4 determines that the motion quantity is higher than the threshold, thereby implementing a first duration for the 'OFF' phase (again denoted as $T_{OFF}$), after the motion data have passed the sanity check at time t2 and therefore are provided at the output of the inertial measurement system 1 (it should be noted that the example refers to a situation in which the detected motion data pass the sanity check, so that no further measurement phases are required).

In other words, in the example, the same duration for the 'OFF' phase is implemented for motion data generated at time t3, as the one applied for generation of the motion data at previous times t1 and t2.

FIG. 5B shows instead a time frame division of the ODR period, in the case in which the control unit 4 determines that the motion quantity is lower than the threshold, e.g., being indicative of a quiet motion, thereby implementing an increased duration for the 'OFF' phase (here denoted as $T_{OFF\_quiet}$), higher than the first duration $T_{OFF}$, after the motion data have passed the sanity check at time t2 (also in this example, the detected motion data pass the sanity check, so that no further measurement phases are required).

In other words, in the example, an increased duration for the 'OFF' phase ($T_{OFF\_quiet} > T_{OFF}$) is implemented for motion data generated at time t3, with respect to the one applied for generation of the motion data at previous times t1 and t2.

As previously discussed, increasing the 'OFF' time allows to obtain a reduced average current consumption $I_{AVG2}$ (with respect to the average current consumption denoted with $I_{AVG1}$ in FIG. 5A), due to the longer duration of the turn-off condition of the inertial sensor 2. Decreasing instead the 'OFF' time allows closer monitoring of the motion data and thus increased accuracy of detection.

Figure 6:
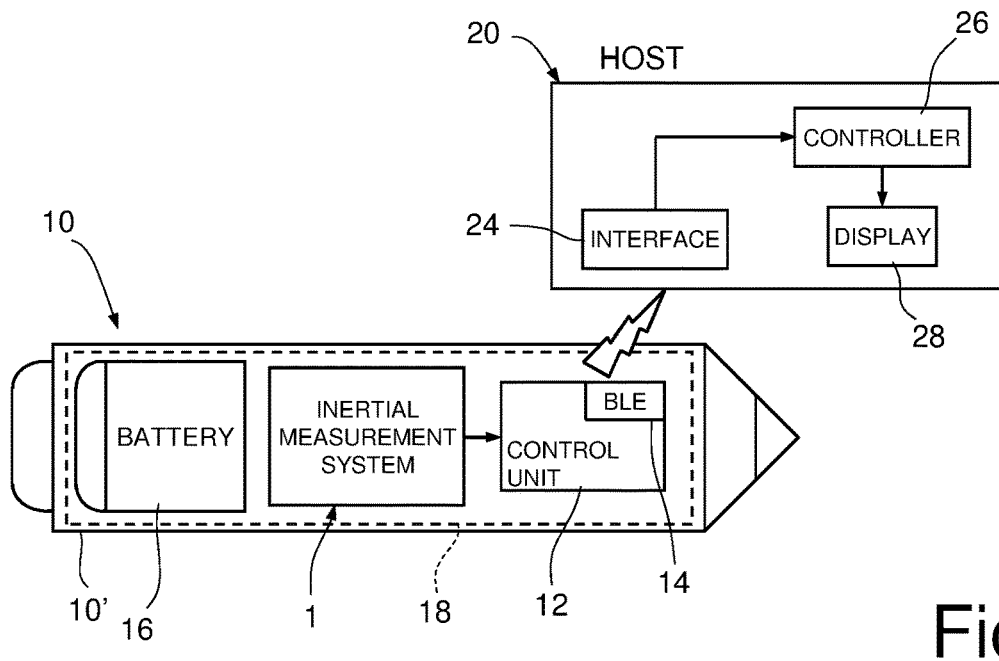
FIG. 6 is a schematic block diagram of a system comprising an electronic device, e.g., a digital-pen-like device, incorporating the inertial measurement system of FIG. 2 and an associated host electronic apparatus.

FIG. 6 schematically shows a portable or wearable electronic device 10, in particular a digital-pen-like device, which comprises, within a case or housing 10' thereof, the inertial measurement system 1, including, as previously discussed, the inertial sensor 2 and the associated control unit 4.

The electronic device 10 further comprises: a management module 12, e.g., including a microcontroller, a microprocessor or any other suitable computing unit, coupled to the inertial measurement system 1 to receive the generated motion-detection signal $S_{det}$ indicative of the detected motion and configured to process the motion-detection signal $S_{det}$ e.g., for determining displacement of the same electronic device 10 between a current and a previous position and generate corresponding displacement data; and a data transmission module 14, e.g., a Bluetooth Low-Energy (BLE) module, coupled to the management module 12 and operable to send wirelessly data packet, e.g., including the displacement data, to a host apparatus, here shown schematically and denoted with 20, to which the electronic device 1 is communicatively coupled.

The electronic device 10 further comprises a battery unit 16, configured to provide a power supply to all components of the same electronic device 10, namely the inertial measurement system 1 (in particular providing the biasing signal Val to the micromechanical structure 2a and the associated electronic circuitry 2b of the same inertial sensor 2), the management module 12 and the transmission module 14.

As shown schematically, the above components of the electronic device 1 may be coupled to a same circuit board (e.g., a PCB—Printed Circuit Board) 18, housed within the casing 10' of the electronic device 10.

It is noted that the management module 12 of the electronic device 10 may also implement the above discussed control unit 4 of the inertial measurement system 1, or may be distinct and operatively coupled to the same control unit 4.

According to a possible embodiment, the inertial measurement system 1 may be entirely implemented in the ASIC circuit.

As shown in the same FIG. 6 the host apparatus 20, for example a smartphone, a phablet or a tablet, may comprise: a respective communication interface 24, designed to communicate with the data transmission module 14 of the electronic device 10, e.g., via the Bluetooth Low Energy data communication; a main controller 26, e.g., a microprocessor unit; and a display 28, defining a screen frame, on which movement of a cursor or other similar displayed element is controlled by the main controller 26.

The electronic device 10 may provide displacement information to the main controller 26 of the host apparatus 20, which is configured to control the movement of the cursor or other similar displayed element on the display 28 according to the same displacement information (the electronic device 1 implementing an "air pointer" device).

The advantages of the disclosed solution are clear from the foregoing description.

In any case, the inertial measurement system 1 achieves very low power consumption, in particular implementing adaptive adjustment of output data rates while maintaining a desired performance in terms of motion detection.

The inertial measurement system 1 provides a high flexibility and configurability in terms of power mode switching of the inertial sensor 2 and checks related to the detected motion data, leading to an improved user experience with respect to known solutions.

It is thus possible to meet power consumption and performance requirements for portable or wearable electronic devices 10 (e.g., digital-pen-like devices implementing air pointer functions and/or additional functions, e.g., gesture recognition functions) that incorporate the same inertial measurement system 1.

Finally, it is clear that modifications and variations may be made to what has been described and illustrated herein, without thereby departing from the scope of the present invention, as defined in the annexed claims.

In particular, different and/or further motion sensors can be included in the inertial measurement system 1, to generate at the output the detection signals $S_{det}$.

Moreover, the present solution may be advantageously applied not only to digital-pen-like devices, but to any kind of electronic device where both requirements of low power consumption and improved user experience have to be satisfied.

What is claimed is:

1. An inertial measurement system, comprising:
   at least one motion sensor configured to output motion data with an output data rate (ODR) period; and
   a control unit coupled to the motion sensor;
   wherein the inertial measurement system is configured to:
      control operation of the motion sensor based on a power mode switching, according to which each ODR period comprises:
         a first phase, in which the motion sensor is controlled in a condition of low power consumption; and
         a subsequent measurement phase, in which the motion sensor is controlled to perform measurements for generation of measurement data; and
      adaptively adjust a duration of the ODR period based on at least one check related to the measurement data generated during the measurement phase.

2. The inertial measurement system according to claim 1, wherein each ODR period further comprises:
   at least one check phase subsequent to the measurement phase and designed to perform the at least one check related to the measurement data generated during the measurement phase; and
   at least one further measurement phase following the check phase, in case the check phase is not successful.

3. The inertial measurement system according to claim 2, wherein the inertial measurement system is configured to control the motion sensor to output, as the motion data, and thus end the ODR period, the measurement data generated in the measurement phase if the check phase is successful; or the measurement data generated in the at least one further measurement phase, if a further check phase subsequent to the further measurement phase is successful.

4. The inertial measurement system according to claim 2, wherein, during the check phase, the inertial measurement system is configured to perform one or more checks related to a quality and a reliability of the generated measurement data.

5. The inertial measurement system according to claim 4, wherein the motion sensor comprises a micromechanical structure and an associated electronic circuitry; and wherein the one or more checks implemented by the inertial measurement system are configured to guarantee that motion data are generated when the following conditions are satisfied:
   the micromechanical structure is correctly operating, at a regime condition; and
   the electronic circuitry is settled to desired operating conditions.

6. The inertial measurement system according to claim 5, wherein the inertial measurement system is configured to adaptively adjust the duration of the first phase of the ODR period based on evaluation of a quantity of motion associated with the generated motion data.

7. The inertial measurement system according to claim 6, wherein the inertial measurement system is configured to:
   increase the duration of the first phase in response to the evaluated quantity of motion being below a motion threshold; and
   decrease the duration of the first phase in response to the evaluated quantity of motion being above a respective motion threshold.

8. The inertial measurement system according to claim 6, wherein the inertial measurement system is configured to evaluate the quantity of motion based on processing of the motion data outputted at an end of a current ODR period and the motion data outputted at an end of at least one previous ODR period.

9. The inertial measurement system according to claim 1, wherein the inertial measurement system is configured to activate a power-down mode of the motion sensor during the first phase of the ODR period, and to deactivate the power-down mode of the motion sensor during the measurement phase.

10. The inertial measurement system according to claim 1, wherein each ODR period further comprises a settling phase, intermediate between the first phase and the measurement phase, in which the motion sensor is controlled so as to settle towards a regime condition.

11. The inertial measurement system according to claim 1, wherein the motion sensor is a gyroscope sensor; wherein the inertial measurement system comprises at least one further motion sensor; and wherein the at least one further motion sensor is an accelerometer sensor.

12. An electronic system comprising:
   a portable electronic device comprising:
      an inertial measurement system comprising:
         at least one motion sensor configured to output motion data with an output data rate (ODR) period; and
         a control unit coupled to the motion sensor;
         wherein the inertial measurement system is configured to:
            control operation of the motion sensor based on a power mode switching, according to which each ODR period comprises:
               a first phase, in which the motion sensor is controlled in a condition of low power consumption; and
               a subsequent measurement phase, in which the motion sensor is controlled to perform measurements for generation of measurement data; and adaptively adjust a duration of the ODR period based on at least one check related to the measurement data generated during the measurement phase; and a management module, coupled to the inertial measurement system;

wherein the portable electronic device is configured to receive and process the motion data generated at output of the inertial measurement system.

13. The electronic system according to claim 12, wherein the portable electronic device is a digital-pen-like device; wherein the portable electronic device is configured to process the motion data generated at output of the inertial measurement system for determining displacement of the portable electronic device between a current and a previous positions and generate corresponding displacement data; and wherein the portable electronic device further comprises a data transmission module, coupled to the management module and operable to wirelessly send the displacement data to a host apparatus.

14. The electronic system according to claim 13, further comprising the host apparatus, wherein the host apparatus comprises:

a communication interface, to communicate with the portable electronic device and receive the displacement data;

a display, defining a screen frame; and a main controller coupled to the communication interface and the display;

wherein the host apparatus is configured to control movement of a displayed element in the screen frame according to the displacement data received from the portable electronic device.

15. A power mode management method in an inertial measurement system comprising at least one motion sensor configured to output motion data with an output data rate (ODR) period, the method comprising:

controlling operation of the motion sensor based on a power mode switching, according to which each ODR period comprises:

a first phase, in which the motion sensor is controlled in a condition of low power consumption; and a subsequent measurement phase, in which the motion sensor is controlled to perform measurements for generation of measurement data; and adaptively adjusting a duration of the ODR period based on at least one check related to the measurement data generated during the measurement phase.

16. The method according to claim 15, wherein each ODR period further comprises:

at least one check phase subsequent to the measurement phase and designed to perform the at least one check related to the measurement data generated during the measurement phase; and at least one further measurement phase following the check phase, in case the check phase is not successful.

17. The method according to claim 16, wherein adaptively adjusting the duration of the ODR period comprises controlling the motion sensor to output, as the motion data, and thus end the ODR period, the measurement data generated in the measurement phase, if the check phase is successful; or the measurement data generated in the at least one further measurement phase, if a further check phase subsequent to the further measurement phase is successful.

18. The method according to claim 16, further comprising, during the check phase, performing one or more checks related to a quality and a reliability of the generated measurement data.

19. The method according to claim 16, wherein adaptively adjusting the duration of the ODR period comprises adjusting the duration of the first phase of the ODR period based on evaluation of a quantity of motion associated with the motion data.

20. The method according to claim 19, wherein adjusting the duration comprises:

increasing the duration of the first phase in response to the evaluated quantity of motion being below a motion threshold; and decreasing the duration of the first phase in response to the evaluated quantity of motion being above a respective motion threshold.

* * * * *